United States Patent

(12) United States Patent
Colle

(10) Patent No.: US 8,279,110 B2
(45) Date of Patent: Oct. 2, 2012

(54) METHOD AND DEVICE FOR DETERMINING THE ANGLE OF BEARING IN A TACAN TYPE RADIONAVIGATION SYSTEM

(75) Inventor: Julien Colle, Laval (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/663,549

(22) PCT Filed: Jun. 9, 2008

(86) PCT No.: PCT/EP2008/057172
§ 371 (c)(1),
(2), (4) Date: Oct. 29, 2010

(87) PCT Pub. No.: WO2008/155252
PCT Pub. Date: Dec. 24, 2008

(65) Prior Publication Data
US 2011/0032133 A1 Feb. 10, 2011

(30) Foreign Application Priority Data
Jun. 8, 2007 (FR) ...................................... 07 04114

(51) Int. Cl.
*G01S 13/08* (2006.01)
(52) U.S. Cl. .......................... 342/49; 342/399; 701/492
(58) Field of Classification Search ............... 342/42–51, 342/399, 492
See application file for complete search history.

(56) References Cited

U.S. PATENT DOCUMENTS

| 3,950,753 A | 4/1976 | Chisholm |
| 2002/0150183 A1 | 10/2002 | Miet |
| 2005/0104767 A1* | 5/2005 | Kirby et al. .................. 342/159 |

FOREIGN PATENT DOCUMENTS

| EP | 1217613 A1 | 6/2002 |
| FR | 2687224 A1 | 8/1993 |

OTHER PUBLICATIONS

Niedzwiecki, et al, 2001. "Smart Copying—A New Approach to Reconstruction of Audio Signals." IEEE Transactions on Signal Processing 49(10): 2272-2282.
Welt, Sanford, 1988. "Design of a Nonlinear TACAN Bearing Tracking Servo Using the Extended Kalman Filter." Proceedings of the 27th Conference on Decision and Control, pp. 736-741.

* cited by examiner

*Primary Examiner* — Timothy A Brainard
(74) *Attorney, Agent, or Firm* — Stroock & Stroock & Lavan LLP

(57) ABSTRACT

Method making it possible to reconstruct a first signal taking the form of a series of pulses of width T, characterized in that it comprises a step in which a delay τ fixed with respect to the first signal to be reconstructed is introduced into a second signal having a sinusoidal shape and in that the porches of width T of the first signal at an instant t are substituted with portions of sinusoid of the second delayed sinusoidal signal corresponding to an instant t−1 so as to reconstruct a signal having a sinusoidal shape.

7 Claims, 2 Drawing Sheets

METHOD AND DEVICE FOR DETERMINING THE ANGLE OF BEARING IN A TACAN TYPE RADIONAVIGATION SYSTEM

CROSS REFERENCE TO RELATED APPLICATIONS

The present application is the U.S. National Phase of International Patent Application Serial No. PCT/EP2008/057172, filed Jun. 9, 2008, which claims the benefit of French Patent Application Serial No. 0704114, filed Jun. 8, 2007, both of which are hereby incorporated by reference in their entireties.

FIELD OF INVENTION

The present invention relates to a method and a system for determining a bearing angle composed, for example, of the azimuth of a revolving transmitter or a rotating beacon, this angle being determined by means of the signal supplied by the revolving transmitter, with a measurement accuracy of the order of 0.5° in operation.

The signal emitted by the transmitter is a modulated signal supporting a sinusoid. The pulses transmitted by the transmitter or transmit antenna are substantially equal.

The value set for the measurement accuracy depends on the application: +/−3° at 15 Hz only, +/−1° at 15 Hz+135 Hz for example.

PRIOR ART

The prior art described in the applicant's patent FR 2 687 224 discloses a method using the pulse pairs of a TACAN bearing signal supplied by a TACAN radio beacon, to determine the envelope of this signal and deduce therefrom the bearing angle, that is to say the azimuth of the radio beacon. In this document, the method implements correlations associated with trigonometric calculations, and determines the envelope of the signal by cycles of one fifteenth of a second, by means of hypothetical pulses that are evenly distributed and whose amplitude is, at least in the absence of suppression, in the bearing signal, the mean of the amplitudes of the two pairs of pulses of the bearing signal situated closest to and on either side of the hypothetical pulse concerned and at a given maximum distance from the hypothetical pulse concerned.

FIG. 1 represents a method according to the prior art described in the abovementioned patent. This figure shows a TACAN receiver 1, which picks up the signal transmitted by a TACAN radio beacon. This signal is made up of pairs of pulses, some of which are grouped together and have a predetermined coding in order to construct the main reference signal which is transmitted when the tooth of maximum amplitude of the radio pattern of the radio beacon passes due East.

The receiver 1 delivers, to an analog-digital converter 2, a signal J. This signal is made, for each pair of signals, of a single pulse whose amplitude is equal to the peak amplitude of the first pulse of each pair; for simplicity, it will be stated hereinbelow that the receiver delivers pairs of pulses to the converter 2. The output signals from the converter 2 are supplied to a control circuit 3 and to a memory 7, double-access for example. The receiver 1 has a main reference decoding circuit which, to simplify the explanations, has been represented in FIG. 1 by a block 4 external to the receiver 1. The decoding circuit supplies a signal Q made up of a pulse that indicates the appearance of the reference signal in the signal that has been picked up.

The method applies a sampling with storage corresponding to samples obtained by cycles of one fifteenth of a second, that is to say over a period of the 15 Hz component of the TACAN signal. In the interests of simplicity, it is best to have a whole number of sampling windows not only during the period of the 15 Hz component, but also during the period of the 135 Hz component.

In the embodiment described using FIG. 1, the number of sampling windows during a fifteenth of a second is 288, which makes 32 windows during a period of the 135 Hz component. These windows are generated using a clock, 5, of frequency equal to 4320 Hz which feeds a counting circuit 6, which counts from 0 to 287 and restarts from 0.

The counting circuit is reset to 0 by the pulse delivered by the decoding circuit 4 on the appearance of the main reference signal. The counting circuit 6 supplies to the control circuit 3 a strobe circuit that alternatively assumes the values 0 and 1 during a time equal to (1/288). (1/15) second, starting with the value 0 at the moment t=0 when the main reference signal appears. The counting circuit also supplies, in synchronism with the main reference signal, the write addresses in the 288 positions of the memory 7, thus defining 288 sampling windows: upon each new 0 or 1 state of the main reference signal.

The direct processing of the pulses according to the prior art, in order to determine the envelope of these pulses, leads to very significant calculations.

To avoid this, it is proposed to determine this envelope by means of hypothetical pulses that are evenly distributed and whose amplitude is the mean of the amplitudes of the two pulses of the TACAN signal situated closest to the hypothetical pulse concerned, on either side of this hypothetical pulse concerned.

However, the time between the received pulses can reach 2.5 ms whereas the accuracy must now reach 150 μs. Bearing in mind that variation in operation can reach 20°/s, the measurements given with this method are not within the 0.5° tolerance desired in most applications.

The method according to the invention relies, notably, on the use of a module for reconstructing the period t of a signal at a given instant using the signal corresponding to the past period (t−1). For example, in the case of a sinusoidal-type signal, the module makes it possible to replace the stages of a period, with branches of sinusoid of frequency $F_1$ and of sinusoid of frequency $F_2$, originating from the outputs respectively of a filter corresponding to the frequency $F_1$ and of a filter corresponding to the frequency $F_2$ at the period t−1.

The stages have a width T that varies, for example from 60 μs to 2.5 ms. Their period corresponds to t of value equal to 15 Hz for $F_1$ and 135 Hz for $F_2$ of the signal and the period t−1 of the delayed signal, in the case of a TACAN application.

SUMMARY OF INVENTION

The subject of the invention relates to a method making it possible to reconstruct a first signal taking the form of a series of pulses of width T, characterized in that said first signal is derived from a revolving beacon and takes the form of a sinusoidal signal, said first signal to be reconstructed is filtered in a first filter at a frequency $F_1$ and in a second filter at a frequency $F_2$, the signal $SF_1$ obtained from the first filter and the signal $SF_2$ obtained from the second filter are transmitted to a summing device then to a device that introduces a delay value τ, and in that one or more stages of width T of said first signal to be reconstructed are replaced by a second sinusoidal signal and delayed by adding the delay τ to said first signal, by portions of sinusoid of the second delayed sinusoidal signal corresponding to an instant t−1 in order to reconstruct a signal having a sinusoidal shape.

The reconstructed signal of frequency $F_1$ and the reconstructed signal of frequency $F_2$ are, for example, transmitted to a device receiving a reference and making it possible to calculate the bearing angles at the frequencies $F_1$ and $F_2$.

The frequencies $F_1$ and $F_2$ can be respectively equal to 15 Hz and 135 Hz.

The invention also relates to a device making it possible to reconstruct the envelope of a first signal having a sinusoidal shape and obtained from a revolving beacon, characterized in that it comprises at least the following items: a pulse detector linked to a decoding device after which a first signal takes the form of "stages" of time width T, a device for reconstructing the present using the past comprising at least one low-pass filter at a first frequency $F_1$ and a bandpass filter at a second frequency $F_2$, a device adding a delay τ of a given value to the signal obtained from the filter in the form of a sinusoid, the device for reconstructing the present using the past replacing one or more stages of said first signal to be reconstructed received at an instant t, a portion of sinusoid of the signal delayed by the delay τ of sinusoidal type, the replacement sinusoid portion having a time duration substantially equal to the value T of the replaced porch.

The device can comprise two filters, respectively a low-pass filter at a first frequency $F_1$ and a bandpass filter at a second frequency $F_2$, a first device for calculating the mean value $VmF_1$ of the signal obtained from the first low-pass filter and a second device for calculating the mean value $VmF_2$ of the second signal obtained from the bandpass filter, a first and a second device for detecting inflection points ($VF_1$, $VF_2$) receiving the mean values of the two reconstructed signals and a device for calculating the bearing angle from the two reconstructed signals and from the references obtained from a digital accumulation oscillator, the digital oscillator being based on a principle of slaving the internal references of the device on external references.

The detection device is a TACAN pulse detector linked to a pair decoding device and to a reference decoding device, and the first filter is a low-pass filter at 15 Hz and the second filter is a bandpass filter of frequency 135 Hz.

BRIEF DESCRIPTION OF THE DRAWINGS

Other characteristics and advantages of the present invention will become more apparent from reading the following description, given by way of illustration and by no means limiting, with appended figures that represent.

DETAILED DESCRIPTION OF THE PREFERRED EMBODIMENTS

Figure 1:
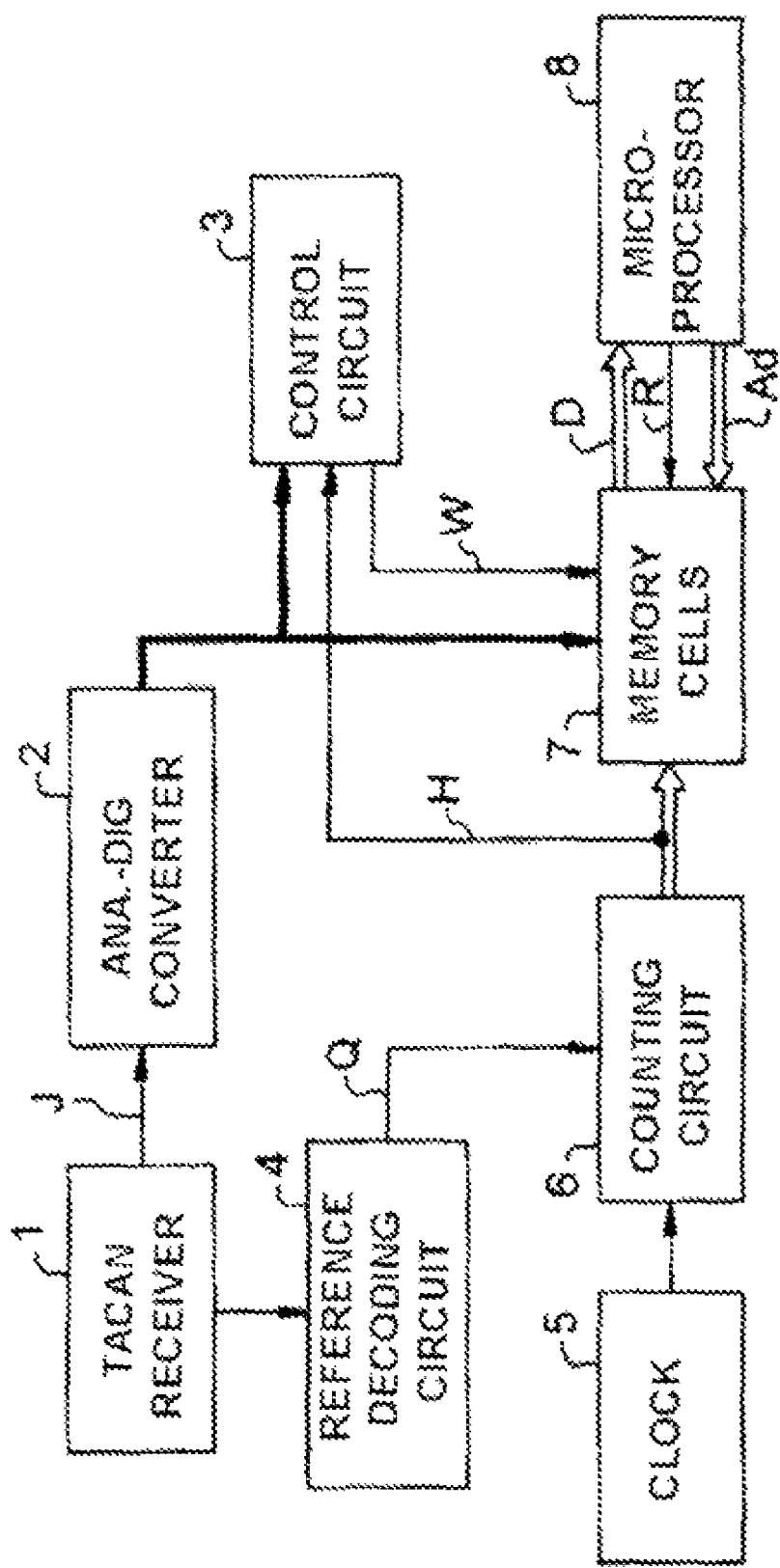
FIG. 1, a diagram of the architecture according to the prior art.
Figure 2:
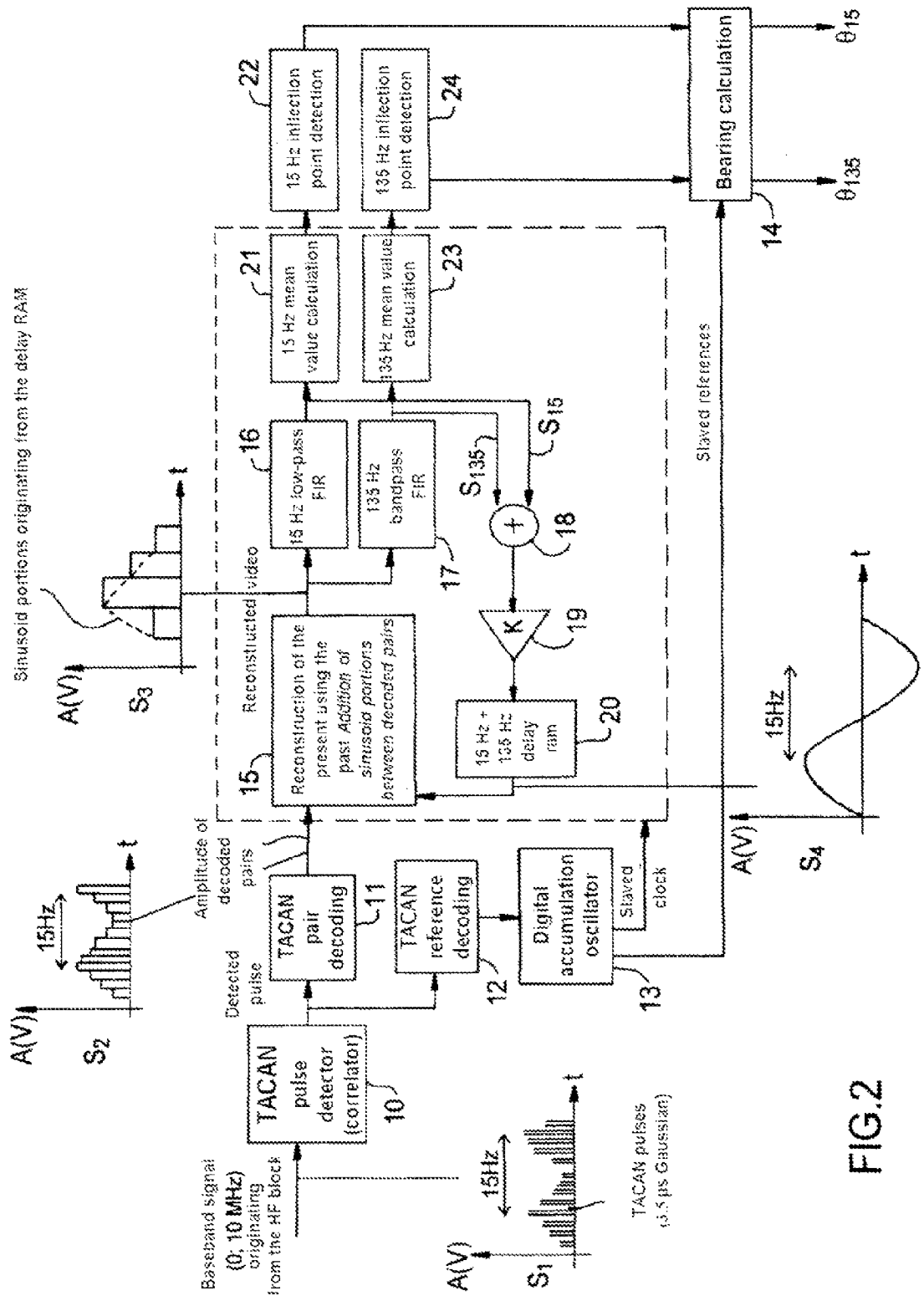
FIG. 2, a diagram illustrating the general operation of the system for determining the bearing angle by using the inventive method.

In order to better explain the principle implemented in the present patent application, the method and the device according to the invention are explained by way of illustration for a TACAN system, as represented in FIG. 2, on which are diagrammatically represented the signals at different points of the system, for the frequency of 15 Hz, bearing in mind that the form of the signal for the 135 Hz frequency is substantially identical.

As a reminder, the TACAN system has three main functions:
1—a Morse code function,
2—an oblique distance function,
3—a magnetic angular bearing function.

The subject of the invention relates to the angular bearing function and the accuracy of the associated measurement. The aim of the bearing function is to measure a time difference making it possible to obtain the phase difference between two signals transmitted by the beacon with rotary antenna. One of these signals $S_{ref}$ is used as a reference and is transmitted by pulse position modulation. The other signal $S_{var}$ is variable and is transmitted by amplitude modulation; its phase depends on the bearing of the mobile carrier or airplane with respect to the beacon.

The measurement of difference (time) or phase difference is carried out between the reference signal $S_{ref}$ and the point at mid-amplitude with positive slope of the modulation envelope. The modulation envelope is made up of the pulses transmitted by the beacon, $S_1$. The critical point for the bearing accuracy (corresponding to a jitter of less than +/−0.5°, for example) is the phase difference on the overall modulation envelope.

The objective of the present invention is to reconstruct the discretized envelope received in order to obtain the image of the real envelope transmitted by the beacon, in order to determine the inflection point of the sinusoid with maximum accuracy.

This envelope is normally obtained by decoding TACAN pairs (2700/sec in the example corresponding to the above-mentioned data) transmitted by the beacon. The overall envelope is made up of two modulation frequencies (15 Hz and 135 Hz). A low-pass filter and a bandpass filter will make it possible to separate these two envelopes.

Each filter (low-pass or bandpass) receives as input a succession of stages (2700/sec) that are inscribed in the 15 Hz and 135 Hz sinusoids of the TACAN modulation. These stages induce a phase difference on the envelope reconstructed at the output of the filter. The phase difference is equal to the maximum deviation between two pairs of pulses transmitted by the beacon and is reflected in an oscillation known by the term jitter on the measurement of the bearing angle. The maximum deviation between two pairs can be 2.5 ms which is equivalent to an inaccuracy of 13.4°.

In FIG. 2, the exemplary device according to the invention comprises a TACAN pulse detector 10. A detected pulse is transmitted on the one hand to a TACAN pair decoding device 11, and to a TACAN reference decoding device 12. The TACAN references are transmitted to a digital accumulation oscillator 13 whose function is notably to transmit the slaved references to a device 14 for calculating the bearing or bearing angle. The digital accumulation oscillator 13 supplies the clock used to slave the system as a whole. It is said oscillator that will supply the reference signal making it possible to perform the bearing calculation.

The detection 10 of the TACAN pulses transmitted by the beacon followed by the decoding of the pairs 11 (made up of these pulses) make it possible to obtain a discretization of the 15 Hz and 135 Hz envelopes of the beacon, signal $S_2$ in the diagram.

The amplitude of the decoded pairs obtained from the decoding of the TACAN pairs is transmitted to a device 15 that is said to be for "reconstructing the present using the past", whose function is notably to replace stages with portions of sinusoids between decoded pairs, the sinusoid portions corresponding to a signal delayed by implementing the method according to the invention described hereinbelow. The device 15 supplies a reconstructed signal diagrammatically represented by the signal $S_3$. The reconstructed signal is transmitted on the one hand to a 15 Hz low-pass filter, 16, and to a 135 Hz bandpass filter, 17.

The signal $S_{15}$ filtered at 15 Hz is transmitted on the one hand to a device 21 that makes it possible to calculate the mean value $VmF_1$, then to a device 22 suitable for detecting the inflection point at 15 Hz, $VF_{15}$.

The signal $S_{135}$ filtered at 135 Hz is transmitted on the one hand to a device 23 making it possible to calculate the mean value $VmF_2$, then to a device 24 suitable for detecting the 135 Hz inflection point, $VF_{135}$.

The two values of the inflection points are then used by the bearing calculation device receiving the slaved references, to determine the bearing angle, respectively for the angles $\theta_{15}$ (for the 15 Hz frequency, the angle can vary between 0 and 360° and $\theta_{135}$ (in the case of the 135 Hz frequency, the bearing angle can vary between 0 and 40°), according to a method known to those skilled in the art regarding the measurement of the time) between the 15 Hz inflection point and the reference of the train of references, or slaved MRB (main reference burst), and the measurement of the time between the 135 Hz inflection point and the slaved MRB reference.

The signal filtered at 15 Hz is also transmitted to a summing device 8 which also receives the signal filtered at 135 Hz. The sum of the signals $S_{15}$ and $S_{135}$ is transmitted to an amplifier 9 before being sent to a RAM 10 whose function is notably to introduce a time delay $\tau$ on the signal (this delay notably corresponds to the processing time of the filters). The delayed signal $S_2$ corresponds to the sinusoid portions that are added to the signal obtained from the TACAN pair decoding to "replace the porch T between decoded pairs" in order to produce the reconstructed signal used to calculate the bearing angle.

The method according to the invention relies, notably, on the use of the module for reconstructing the present using the past 15 that makes it possible to replace the stages with a period t, with branches of 15 Hz sinusoid and of 135 Hz sinusoid originating from the outputs respectively of the low-pass filter and of the low-pass filter corresponding to the period t−1 (having therefore undergone a delay $\tau$). The part of the signal corresponding to the period t−1 is injected at the input of the two filters, it is associated with the samples of the signal corresponding to the period t. Thus, the maximum phase difference is equal to the phase difference induced by the angular speed of the aircraft relative to the beacon, the latter being negligible relative to the maximum deviation between two pairs transmitted by the beacon.

For a period t, the signal obtained from the TACAN pair decoding device comprising a 15 Hz signal and a 135 Hz signal is transmitted to the "device for reconstructing the present". The added sinusoid portions are obtained by adding the signals obtained from the low-pass and bandpass filters that are located at frequencies respectively of 15 Hz and 135 Hz. The duly constructed signal is, for example, amplified in the amplifier 19 of gain K before passing through the delay memory 20 which is used to add a time delay $\tau$ whose value corresponds, for example, to the delays resulting from the passage of the signals into the equipment that is present, notably the delay induced by the filters. Thus, the signal obtained from this delay device takes the form of a sinusoid having 15 and 135 Hz frequency components, for a period t−1.

The value of the delay is determined, for example, by taking into account the 15 Hz value for the 15 Hz sinusoid and 135 Hz for the 135 Hz sinusoid and the overall time engendered by the processing subsystem and the filters.

The value of the gain K of the gain amplifier 19 is, for example, less than 1.

The output of the low-pass filter, 15 Hz, therefore corresponds to a signal having a sinusoidal form that is transmitted to the device 21 used to calculate its mean value, before detecting the inflection point 22 corresponding to the sinusoid of frequency 15 Hz.

The output of the high-pass filter, 135 Hz, therefore corresponds to a signal having a sinusoidal form that is transmitted to the device 23 used to calculate its mean value, before detecting the inflection point 24 corresponding to the sinusoid of frequency 135 Hz.

The assembly of the device for reconstructing the present from the past and of the bearing calculation device is slaved by a clock. The choice of the value of the clock frequency for discretizing the signal is made, for example, as follows: the outputs specified by the technical clauses of a given application are characterized, for example, by a 12 bit bearing word with, as most significant bit at 180°, which leads to a binary counter whose division ratio is $2\exp(12)=4096$. Given that, for the example given, the measurement period is $\frac{1}{15}$ sec, the reference frequency must be a multiple of $4096*15=61440$ Hz.

A beacon transmits the train of main references at a frequency of 15 Hz. Now this 15 Hz is supplied by the local oscillator specific to the beacon. In order to increase the accuracy of measurement, the interrogator rallying the beacon must be slaved on the 15 Hz transmitted by the beacon using the trains of main references received. An accumulation oscillator is used, for example, in order to slave the internal 15 Hz on the beacon's 15 Hz. This system supplies a slaved clock at 61440 Hz on the 15 Hz from the beacon.

The values $V_{15}$ and $V_{135}$ of the inflection points obtained are then transmitted to the bearing calculation device 14 that also receives the slaved references. The bearing calculation device executes steps known to those skilled in the art to measure the time between the two signals and then the bearing angles $\theta_{15}$ and $\theta_{135}$ corresponding to the 15 Hz and 135 Hz frequencies.

Without departing from the framework of the invention, the method whose steps have been described hereinabove can be applied to any device that receives a signal having the form of a series of pulses separated by a time period T and for which the aim is to reconstruct the signal in the form of a sinusoid.

The invention claimed is:

1. A method to reconstruct a first signal taking the form of a series of pulses of width T, said first signal derived from a revolving beacon and taking the form of a sinusoidal signal, wherein:

said first signal to be reconstructed is filtered in a first filter at a frequency $F_1$ and in a second filter at a frequency $F_2$, a signal $SF_1$ obtained from the first filter and a signal $SF_2$ obtained from the second filter being transmitted to a summing device and then to a device that introduces a delay value $\tau$ to generate a delayed second signal, and wherein:

one or more stages of width T of said first signal to be reconstructed are replaced by sinusoidal portions of the delayed second signal corresponding to an instant t−1 in order to reconstruct a signal having a sinusoidal shape.

2. The method as claimed in claim 1, wherein a reconstructed signal of frequency $F_1$ and a reconstructed signal of frequency $F_2$ are transmitted to a device receiving a reference to calculate bearing angles at the frequencies $F_1$ and $F_2$.

3. The method as claimed in claim 2, wherein the frequencies $F_1$ and $F_2$ are respectively substantially equal to 15 Hz and 135 Hz.

4. A device to reconstruct an envelope of a first signal having a sinusoidal shape and obtained from a revolving beacon, the device comprising:
- a pulse detector linked to a decoding device after which a first signal takes a form of stages of time width T,
- a reconstructing device comprising at least one low-pass filter at a first frequency and a bandpass filter at a second frequency,
- a delay device for adding a delay $\tau$ of a given value to a sinusoidal signal obtained from the low-pass filter and the bandpass filter, the reconstructing device replacing one or more stages of said first signal received at an instant t with a replacement sinusoidal portion of a sinusoidal signal received from the delay device delayed by the delay $\tau$, the replacement sinusoidal portion having a time duration substantially equal to the time width T of the replaced stages.

5. The device as claimed in claim 4, further comprising a digital accumulation oscillator, a first device for calculating a first mean value of a signal obtained from the first low-pass filter, a second device for calculating a second mean value of a signal obtained from the bandpass filter, a third and a fourth device for detecting inflexion points using the first and second mean values, and a fifth device for calculating a bearing angle from the inflexion points and from references obtained from the digital accumulation oscillator, the digital oscillator slaving internal references on external references.

6. The device as claimed in claim 5, wherein the pulse detector is a TACAN pulse detector linked to a pair decoding device and to a reference decoding device, and wherein the first frequency is substantially 15 Hz and the second frequency is substantially 135 Hz.

7. The device as claimed in claim 4, wherein the pulse detector is a TACAN pulse detector linked to a pair decoding device and to a reference decoding device, and wherein the first frequency is substantially 15 Hz and the second frequency is substantially 135 Hz.

\* \* \* \* \*